(12) United States Patent
Chihara et al.

(10) Patent No.: US 10,245,643 B2
(45) Date of Patent: Apr. 2, 2019

(54) SINTERED BODY

(71) Applicant: Sumitomo Electric Industries, Ltd., Osaka-shi (JP)

(72) Inventors: Kentaro Chihara, Itami (JP); Hironari Moroguchi, Itami (JP); Takashi Harada, Itami (JP); Satoru Kukino, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 149 days.

(21) Appl. No.: 15/520,948

(22) PCT Filed: Oct. 14, 2015

(86) PCT No.: PCT/JP2015/079025
§ 371 (c)(1),
(2) Date: Apr. 21, 2017

(87) PCT Pub. No.: WO2016/063769
PCT Pub. Date: Apr. 28, 2016

(65) Prior Publication Data
US 2017/0341153 A1    Nov. 30, 2017

(30) Foreign Application Priority Data
Oct. 23, 2014 (JP) ................. 2014-216028

(51) Int. Cl.
| | | |
|---|---|---|
| *B23B 27/14* | (2006.01) | |
| *C01B 21/082* | (2006.01) | |
| *C04B 35/626* | (2006.01) | |
| *C04B 35/64* | (2006.01) | |
| *C04B 35/645* | (2006.01) | |
| *C04B 35/5831* | (2006.01) | |
| *C04B 35/597* | (2006.01) | |
| *C04B 35/628* | (2006.01) | |

(52) U.S. Cl.
CPC ............ *B23B 27/14* (2013.01); *C01B 21/082* (2013.01); *C04B 35/5831* (2013.01); *C04B 35/597* (2013.01); *C04B 35/626* (2013.01); *C04B 35/62836* (2013.01); *C04B 35/64* (2013.01); *C04B 35/645* (2013.01); *C04B 2235/386* (2013.01); *C04B 2235/3873* (2013.01)

(58) Field of Classification Search
CPC . B23B 27/14; C01B 21/082; C04B 2235/386; C04B 2235/3873; C04B 35/5831; C04B 35/597; C04B 35/626; C04B 35/62836; C04B 35/64; C04B 35/645
USPC ....... 428/697, 698, 699, 701, 702, 336, 403; 501/98.1, 98.2
See application file for complete search history.

(56) References Cited

U.S. PATENT DOCUMENTS

| | | | | |
|---|---|---|---|---|
| 5,672,382 A * | 9/1997 | Lux | ............ | B01J 8/1836 |
| | | | | 427/213 |
| 2002/0107135 A1* | 8/2002 | Roy | ............ | C04B 35/597 |
| | | | | 501/98.2 |
| 2004/0023035 A1* | 2/2004 | Brandon | ............ | C25D 13/02 |
| | | | | 428/411.1 |

FOREIGN PATENT DOCUMENTS

| | | |
|---|---|---|
| EP | 3187476 A1 | 7/2017 |
| JP | H05-301776 A | 11/1993 |
| JP | 2011-121822 A | 6/2011 |
| JP | 2011-140415 A | 7/2011 |
| JP | 2015-044723 A | 3/2015 |

* cited by examiner

Primary Examiner — David Sample
Assistant Examiner — Elizabeth Collister
(74) Attorney, Agent, or Firm — Baker Botts L.L.P.; Michael A. Sartori

(57) ABSTRACT

A sintered body includes a first hard particle, a second hard particle, and a binder. The first hard particle is an M sialon particle having a coating layer. The M sialon particle is represented by $M_xSi_{(6-x-z)}Al_zO_zN_{(8-z)}$ (in the formula, M is a metal containing at least one selected from the group consisting of calcium, strontium, barium, scandium, yttrium, lanthanoid, manganese, iron, cobalt, nickel, copper, and group IV, group V, and group VI elements of the periodic table, and relationships of $0.01 \leq x \leq 2$, $0.01 \leq z \leq 4.2$, and $1.79 \leq (6-x-z) \leq 5.98$ are satisfied). The second hard particle is a cubic boron nitride particle.

12 Claims, No Drawings

SINTERED BODY

TECHNICAL FIELD

The present invention relates to a sintered body and a cutting tool including the sintered body. More specifically, the present invention relates to a sintered body containing sialon and cubic boron nitride and a cutting tool including the sintered body.

BACKGROUND ART

Sialon has a structure in which aluminum and oxygen are dissolved in silicon nitride. In general, there are two types of crystal systems of sialon, namely, α-sialon and β-sialon that belong to a hexagonal crystal system. Sialon-based sintered bodies containing such sialon have a characteristic of low reactivity with metals and have been developed as materials for cutting tools. Recently, there have been developed sintered bodies containing cubic sialon, which has higher hardness than α-sialon and β-sialon, in order to increase hardness and to improve wear resistance when the sintered bodies are used as cutting tools (Patent Literature 1).

There have been developed sintered bodies further containing, in addition to cubic sialon, cubic boron nitride (hereinafter referred to as "cBN"), which has high hardness second to diamond, in order to further increase hardness and to further improve wear resistance when the sintered bodies are used as cutting tools (Patent Literature 2). Cutting tools that include such a sintered body containing sialon and cBN exhibit good wear resistance in machining a difficult-to-cut material such as Inconel (trademark of Special Metals Corporation), which is a nickel-based heat-resistant alloy.

CITATION LIST

Patent Literature

PTL 1: Japanese Unexamined Patent Application Publication No. 2011-121822
PTL 2: Japanese Unexamined Patent Application Publication No. 2011-140415

SUMMARY OF INVENTION

Technical Problem

For structural members used in jet engines for airplanes and gas-turbine engines for power generation, for which an improvement in fuel consumption has been recently desired for saving energy, the ratio of use of, for example, Hastelloy (trademark of Haynes International, Inc.) and Inconel 713C, which are materials having a particularly high high-temperature strength among nickel-based heat-resistant alloys, has been increasing. In cutting these materials, the wearing down of tools and boundary failure proceeds significantly because the workpiece has excellent high-temperature strength and thus the workpiece is not easily softened even in the vicinity of a cutting edge. Accordingly, use of an existing cutting tool may cause a problem in that the cutting tool reaches its life within a short time.

Cutting tools that include a sintered body containing sialon and cBN exhibit good wear resistance in high-speed cutting of a difficult-to-cut material such as Inconel; however, the cutting edges of the tools may suddenly fracture during cutting. Therefore, these cutting tools do not yet have sufficient fracture resistance. The fracture of a cutting tool causes a serious problem in cutting of, for example, airplane engine components and automobile engine components, for which a high dimensional precision and high surface integrity are required. Therefore, an improvement in fracture resistance has been desired for cutting tools that include a sintered body containing sialon and cBN.

An object of the present invention is to improve fracture resistance in a cutting tool that includes a sintered body containing sialon and cBN and that machines, at a high speed, difficult-to-cut materials such as heat-resistant alloys, e.g., Inconel and titanium alloys.

Solution to Problem

A first aspect of the present invention is a sintered body including a first hard particle, a second hard particle, and a binder. The first hard particle is an M sialon particle having a coating layer. The M sialon particle is represented by $M_xSi_{(6-x-z)}Al_zO_zN_{(8-z)}$ (in the formula, M is a metal containing at least one selected from the group consisting of calcium, strontium, barium, scandium, yttrium, lanthanoid, manganese, iron, cobalt, nickel, copper, and group IV, group V, and group VI elements of the periodic table, and relationships of $0.01 \leq x \leq 2$, $0.01 \leq z \leq 4.2$, and $1.79 \leq (6-x-z) \leq 5.98$ are satisfied). The second hard particle is a cBN particle.

Advantageous Effects of Invention

According to the present invention, when a difficult-to-cut material such as a heat-resistant alloy, e.g., Inconel or a titanium alloy is cut at a high speed by using a cutting tool that includes a sintered body containing sialon and cBN, fracture of a cutting edge of the tool can be reduced while good wear resistance is maintained.

DESCRIPTION OF EMBODIMENTS

In view of the requirements described above, the inventors of the present invention conducted extensive studies on a method for improving fracture resistance while focusing on the structure of a sintered body containing sialon and cBN, in particular, the composition and the form of sialon particles in the sintered body. As a result, it was found that, by dissolving a metal element containing at least one selected from the group consisting of calcium, strontium, barium, scandium, yttrium, lanthanoid, manganese, iron, cobalt, nickel, copper, and group IV, group V, and group VI elements of the periodic table in sialon particles at a predetermined ratio to reduce thermal conductivity, and by providing a coating layer formed of a particular nitride or carbonitride on surfaces of the resulting sialon particles in which the metal element is dissolved (hereinafter referred to as "M sialon particles"), fracture resistance of a cutting edge of a cutting tool that includes the sintered body can be improved while making use of the feature of good wear resistance of the sintered body. This finding led to the realization of the present invention.

Embodiments of a sintered body according to the first aspect of the present invention will now be described.

A sintered body of the present invention is a sintered body including a first hard particle, a second hard particle, and a binder. The first hard particle is an M sialon particle having a coating layer. The M sialon particle is represented by $M_xSi_{(6-x-z)}Al_zO_zN_{(8-z)}$ (in the formula, M is a metal containing at least one selected from the group consisting of calcium, strontium, barium, scandium, yttrium, lanthanoid, manganese, iron, cobalt, nickel, copper, and group IV, group V, and group VI elements of the periodic table, and relationships of $0.01 \leq x \leq 2$, $0.01 \leq z \leq 4.2$, and $1.79 \leq (6-x-z) \leq 5.98$ are satisfied). The second hard particle is a cBN particle.

Cutting tools that include a sintered body containing sialon and cBN exhibit good wear resistance in machining of difficult-to-cut materials such as Inconel. However, when a metal or an intermetallic compound of Al or Ti is used as the binder, sialon may react with the binder and decompose in a sintering process to produce reaction products such as silicon oxide, aluminum oxide, a metal nitride, and a metal silicide. It is believed that this is because the metal of the binder is melted at a high temperature to form a liquid phase and accelerates the decomposition of sialon, Si, Al, O, and N elements produced by the decomposition are recombined through the liquid phase, and the reaction products are crystallized. When Co is used as the binder, the production of a metal nitride or a metal silicide does not occur in the sintering process, but the decomposition of sialon significantly occurs and silicon oxide and aluminum oxide are produced in the sintered body in large amounts. Many of the reaction products have a low hardness or are brittle, and thus the reaction products may decrease mechanical properties of the sintered body.

The inventors of the present invention examined the type of damage of a cutting edge received when Inconel was cut at a high speed by using a sintered body tool containing sialon and cBN. According to the results, it was found that V-shaped damage occurred in a boundary portion of the tool. In order to clarify the mechanism of the occurrence of such tool damage during machining of Inconel, the inventors of the present invention examined the relationship between chips generated during cutting and the damage of a cutting edge of a tool. Consequently, it was found that when Inconel was cut, chips having a higher hardness than the workpiece were generated, and the chips pass while continuously scratching a rake face of the tool, resulting in the occurrence of V-shaped deep boundary failure when viewed from the flank face side of the tool. Furthermore, in high-speed cutting of a workpiece formed of a Ni-based heat-resistant alloy, the boundary failure significantly occurred, in particular, in a workpiece having a coarse particle size, such as Inconel 713C which is a cast product, or a workpiece having good plastic deformation resistance at a high temperature, such as Hastelloy. With the progress of the damage to the inside of the tool, the strength of the cutting edge decreases.

Furthermore, the relationship between thermal conductivity of the sintered body and the tool damage was examined. The results showed that with an increase in thermal conductivity of the sintered body, when Inconel was cut, the cutting force increased and the boundary failure proceeded significantly, resulting in fracture. The reason for this is believed to be as follows. With an increase in thermal conductivity of a sintered body, the temperature of a cutting edge of the tool during cutting decreases. Accordingly, machining is performed in a state in which the workpiece is not softened and the cutting force is still high. Thus, the boundary failure of the cutting edge becomes significant. In addition, the relationship between fracture toughness of the sintered body and the tool damage was examined. According to the results, it was found that with a decrease in the fracture toughness of the sintered body, the damage increased.

On the basis of the above findings, a method for improving the cutting performance of a sintered body containing sialon particles and cBN particles was examined. The results showed that, by reducing thermal conductivity of the sintered body, the temperature of a cutting edge of a tool during cutting could be maintained at a high temperature in cutting of Inconel, and the cutting force was decreased. Accordingly, the boundary failure of the cutting edge was also decreased, and the fracture of the cutting edge of the tool could be suppressed. The thermal conductivity can be reduced by dissolving a metal element M containing at least one selected from the group consisting of calcium, strontium, barium, scandium, yttrium, lanthanoid, manganese, iron, cobalt, nickel, copper, and group IV, group V, and group VI elements of the periodic table in sialon particles at a predetermined ratio to form M sialon particles represented by a chemical formula $M_xSi_{(6-x-z)}Al_zO_zN_{(8-z)}$. This is because the metal element M, which has an atomic radius different from silicon and aluminum, is dissolved in the crystal structure of sialon, thereby generating distortion in the crystal lattice. Consequently, scattering of phonons occurs to reduce the thermal conductivity. A plurality of different types of elements may be added as the metal element M.

In this case, x and z preferably satisfy the relationships of $0.01 \leq x \leq 2$, $0.01 \leq z \leq 4.2$, and $1.79 \leq (6-x-z) \leq 5.98$. When x is less than 0.01, the amount of metal element M dissolved in the M sialon particles is insufficient and the scattering of phonons becomes insufficient. Accordingly, the thermal conductivity of the M sialon particles does not sufficiently decrease. When x exceeds 2, the amount of the metal element M contained in the sialon particles is excessive, and the thermal conductivity increases instead. Therefore, x is preferably in the range of 0.01 or more and 2 or less.

In addition, by coating surfaces of the M sialon particles with a substance that does not decompose sialon in the sintering process, it became possible to suppress the decomposition of M sialon due to a reaction with the binder in the sintering process. Accordingly, the generation of brittle reaction products could be suppressed, and fracture toughness of the sintered body could be increased. As a result, it became possible to significantly suppress the V-shaped damage that occurred in a boundary portion of a cutting edge of a tool when Inconel was cut at a high speed. In addition, since the decomposition of M sialon due to a reaction with the binder could be suppressed in the sintering process, the generation of reaction products having a low hardness decreased and the hardness of the sintered body increased. Consequently, the tool life in high-speed cutting of Inconel could be significantly improved.

The sintered body preferably has a thermal conductivity of 5 W/m·K or more and 60 W/m·K or less. When the thermal conductivity is less than 5 W/m·K, the temperature of a cutting edge of the tool during cutting excessively increases, and thus the wearing down of the tool may be accelerated. When the thermal conductivity exceeds 60 W/m·K, the temperature of the cutting edge of the tool during cutting is less than a softening temperature of a workpiece. Thus, the suppression of the boundary failure of the cutting edge of the tool may be insufficient. Furthermore, a more preferable thermal conductivity of a sintered body serving as a tool material having balanced wear resistance and fracture resistance is 10 W/m·K or more and 30 W/m·K or less.

The thermal conductivity of the sintered body is determined as follows. A sample for measuring thermal conductivity, the sample having a diameter of 18 mm and a thickness of 1 mm, is cut out from the sintered body. The specific heat and thermal diffusivity of the sample are measured by using a laser flash method thermal constant measuring device. The thermal conductivity is calculated by multiplying the thermal diffusivity by the specific heat and the density of the sintered body.

In the sintered body, the M sialon particle preferably contains at least cubic M sialon. The reason for this is as follows. Cubic M sialon has not only a property of low reactivity with metals, which is unique to sialon, but also a hardness higher than α-M sialon and β-M sialon. Therefore, when the sintered body containing cubic M sialon is used as a cutting tool, wear resistance improves.

The behavior of a phase transformation of M sialon before and after sintering was examined. The results showed that sintering with the addition of a binder that promotes decomposition of sialon tends to promote the phase transformation from cubic M sialon to β-M sialon in the sintering process. The results also showed that, in contrast, coating of surfaces of M sialon particles with a substance that does not decompose sialon in the sintering process can suppress the phase transformation from cubic M sialon to β-M sialon during sintering. It is believed that the coating layer disposed on the surfaces of cubic M sialon particles has not only a function of suppressing of decomposition of cubic M sialon due to a reaction with a binder in the sintering process but also a function of suppressing the phase transformation from cubic M sialon to β-M sialon.

In the sintered body, the coating layer preferably contains at least one compound of nitrides and carbonitrides of at least one element selected from the group consisting of Ti, Zr, Cr, and Al. Examples of the compound that is suitably used include TiN, AlN, TiAlN, TiZrN, AlCrN, and TiCN. The compound prevents the binder and M sialon from contacting with each other in the sintering process and suppress decomposition of M sialon due to a reaction with the binder. In addition, since the compound also has a good binding force with the binder and cBN particles, binding of the M sialon particles coated with the compound with the binder and cBN particles becomes strong. As a result, fracture toughness of the sintered body increases, resulting in a secondary advantage of an improvement in fracture resistance of a cutting tool that includes the sintered body.

In the sintered body, the coating layer preferably has a thickness of 0.01 μm or more and 2 μm or less. When the coating layer has a thickness of less than 0.01 μm, the M sialon particles and the binder are close to each other, and thus the effect of preventing the M sialon particles and the binder from contacting each other, the effect being obtained by the coating layer, decreases. Consequently, suppression of the decomposition of the M sialon particles in the sintering process may become insufficient. When the coating layer has a thickness of more than 2 μm, the ratio of the coating layer in the first hard phase is high, and thus the hardness of the sintered body decreases. Consequently, wear resistance may be insufficient when the sintered body is used as a tool for high-speed cutting.

The thickness of the coating layer is measured as follows. A cross section of the sintered body is subjected to beam processing by using a cross section polisher (CP, manufacture by JEOL Ltd.) or a focused ion beam system (FIB). The cross section after the processing is observed at a magnification of about more than 50,000 by using a transmission electron microscope (TEM) or a field-emission scanning electron microscope (FE-SEM) to measure the thickness of the coating layer. When the composition of the coating layer is similar to the composition of the binder, only the first hard particles are embedded in a resin, and a cross section obtained by performing beam processing is observed by using a TEM or an FE-SEM to measure the thickness of the coating layer. The thickness of the coating layer did not substantially change before and after sintering. The thickness of the coating layer of the sintered body was substantially equal to the thickness of the coating layer measured by using a sample obtained by embedding only the first hard particles in a resin.

In the sintered body, a ratio of a volume of the second hard particle to a volume of the first hard particle is preferably 0.5 or more and 7 or less. When the ratio is less than 0.5, the amount of cBN particles having high toughness and high strength is small, and thus fracture toughness of the sintered body decreases and fracture resistance of a cutting tool including the sintered body may become insufficient. When the ratio exceeds 7, cBN particles are excessively present in the sintered body, and thus an improvement in wear resistance may be insufficient even when M sialon, which has low reactivity with metals, is added. In particular, for applications in which wear resistance of a cutting tool is required, the sintered body more preferably has a composition containing M sialon in a relatively large amount such that the ratio is 0.5 or more and 2 or less. On the other hand, for applications in which fracture resistance is so important that fracture of a cutting tool is not permitted, the sintered body more preferably has a composition containing cBN in a relatively large amount such that the ratio is more than 2 and 7 or less.

The first hard particle and the second hard particle are each added in the form of a powder in a predetermined amount and mixed before sintering. The ratio of the volume of the second hard particle to the volume of the first hard particle in the sintered body can be specified by a method including observing, with a scanning electron microscope (SEM), a cross section of a sintered body subjected to mirror polishing using, for example, a CP device, examining elements constituting the crystal particles by energy dispersive X-ray spectrometry (EDX) to specify the particles of the first hard phase and the second hard phase, thereby determining the area ratio of the particles, and considering the area ratio to be a volume ratio.

In the sintered body, a ratio $R_s$ of an intensity of a main peak of X-ray diffraction of $SiO_2$ to a total of intensities of main peaks of X-ray diffraction of α-M sialon, β-M sialon, cubic M sialon, and $SiO_2$ that are contained in the sintered body is preferably 0.3 or less.

$R_s$ is an index corresponding to the ratio of $SiO_2$ to the first hard phase. The sintered body is subjected to flat grinding by using a #400 diamond grinding wheel, and an X-ray diffraction pattern is obtained by measuring the flat-ground surface using the Cu-Kα characteristic X ray. A peak intensity $I_{c(311)}$ of a (311) plane, which is due to a main peak of cubic M sialon, a peak intensity $I_{α(201)}$ of a (201) plane, which is due to a main peak of α-M sialon, a peak intensity $I_{β(200)}$ of a (200) plane, which is due to a main peak of β-M sialon, and a peak intensity $I_{s(300)}$ of a (300) plane, which is due to a main peak of $SiO_2$, can be determined from the X-ray diffraction pattern. $R_s$ can be calculated from a formula (I) below by using the values of these peak intensities.

$$R_s = I_{s(300)}/(I_{c(311)} + I_{α(201)} + I_{β(200)} + I_{s(300)}) \tag{I}$$

Silicon dioxide ($SiO_2$) is mainly produced as a result of decomposition of M sialon in the sintering process. Since $SiO_2$ is a brittle material, fracture toughness of the sintered body decreases at an $R_s$ of more than 0.3. In this case, fracture resistance may be insufficient when the sintered body is used as a cutting tool.

In the sintered body, a ratio $R_c$ of an intensity of a main peak of X-ray diffraction of cubic M sialon to a total of intensities of main peaks of X-ray diffraction of α-M sialon, β-M sialon, and cubic M sialon that are contained in the M sialon particle is preferably 0.2 or more. $R_c$ is an index corresponding to the ratio of cubic M sialon to the first hard phase. The sintered body is subjected to flat grinding by using a #400 diamond grinding wheel, and an X-ray diffraction pattern is obtained by measuring the flat-ground surface using the Cu-Kα characteristic X ray. A peak intensity $I_{c(311)}$ of a (311) plane, which is due to a main peak of cubic M sialon, a peak intensity $I_{\alpha(201)}$ of a (201) plane, which is due to a main peak of α-M sialon, and a peak intensity $I_{\beta(200)}$ of a (200) plane, which is due to a main peak of β-M sialon, can be determined from the X-ray diffraction pattern. $R_c$ can be calculated from a formula (II) below by using the values of these peak intensities. When $R_c$ is less than 0.2, the hardness of the sintered body decreases, and wear resistance may be insufficient when the sintered body is used as a cutting tool.

$$R_c = I_{c(311)}/(I_{c(311)} + I_{\alpha(201)} + I_{\beta(200)}) \quad (II)$$

In the sintered body, the binder preferably contains at least one element selected from the group consisting of Ti, Zr, Al, Ni, and Co and/or at least one of nitrides, carbides, oxides, and carbonitrides of the elements, and solid solutions thereof. For example, metal elements such as Al, Ni, and Co; intermetallic compounds such as TiAl, and compounds such as TiN, ZrN, TiCN, TiAlN, Ti$_2$AlN, and Al$_2$O$_3$ are suitably used as the binder. The incorporation of the binder can realize strong binding between the first hard particle and the second hard particle in the sintered body. In addition, when the binder has a high fracture toughness, the sintered body also has a high fracture toughness, and thus fracture resistance increases when the sintered body is used as a cutting tool.

In the sintered body, a total content of the first hard particle and the second hard particle in the sintered body is preferably 60% by volume or more and 90% by volume or less. At a total content of less than 60% by volume, the hardness of the sintered body decreases, and wear resistance may be insufficient when the sintered body is used as a cutting tool. At a total content of more than 90% by volume, fracture toughness of the sintered body decreases, and a cutting edge of a tool may be easily fractured when the sintered body is used as a cutting tool.

The first hard particle, the second hard particle, and the binder are each added in the form of a powder in a predetermined amount and mixed before sintering. The content ratio of the first hard particle, the second hard particle, and the binder in the sintered body can be quantified by analyzing, with the Rietveld method, diffraction intensity data obtained by X-ray diffraction of the sintered body. Besides the above X-ray diffraction, the following method may be used for specifying the volume ratio of the first hard particle, the second hard particle, and the binder that are contained in the sintered body. The method includes observing, with a SEM, a cross section of a sintered body subjected to mirror polishing using a CP device or the like, examining elements constituting the crystal particles by EDX to specify the particles of the first hard phase, the second hard phase, and the binder, thereby determining the area ratio of the particles, and considering the area ratio to be a volume ratio.

The sintered body preferably has a Vickers hardness of 22 GPa or more. At a Vickers hardness of less than 22 GPa, when the sintered body is used as a cutting tool, wear resistance may be insufficient, and the tool life may be reduced by wear. Furthermore, a more preferable Vickers hardness of the sintered body serving as a tool material is 25 GPa or more.

The Vickers hardness of a sintered body was measured as follows. A sintered body embedded in a Bakelite resin was polished using diamond abrasive grains having a size of 9 μm for 30 minutes and diamond abrasive grains having a size of 3 μm for 30 minutes. The Vickers hardness was then measured by pressing a diamond indenter onto the polished surface of the sintered body at a load of 10 kgf using a Vickers hardness tester. The Vickers hardness $H_{v10}$ was determined from an indentation formed by pressing the diamond indenter. Furthermore, the length of a crack propagating from the indentation was measured to determine a value of fracture toughness by the indentation fracture (IF) method in accordance with JIS R 1607 (Testing methods for fracture toughness of fine ceramics at room temperature).

A second aspect of the present invention is a cutting tool including the sintered body. The cutting tool can be suitably used for cutting a difficult-to-machine material such as heat-resistant alloys and titanium alloys at a high speed. Nickel-based heat-resistant alloys, which are used in engine components of airplanes or automobiles, have high cutting resistance due to their high high-temperature strength and are difficult-to-machine materials which easily cause wear and fracture of a cutting tool. The cutting tool including the sintered body of the present invention exhibits good wear resistance and fracture resistance even in cutting of Ni-based heat-resistant alloys. The cutting tool including the sintered body of the present invention has a good tool life particularly in cutting of high-strength materials such as Inconel 713C, Udimet, Hastelloy, Waspaloy, and Nimonic.

A method for producing a sintered body according to an embodiment of the present invention will now be described in the order of steps.

(Step of Preparing First Hard-phase Powder)

β-Sialon represented by a chemical formula of Si$_{(6-Z)}$Al$_Z$O$_Z$N$_{(8-Z)}$ (0.01≤z≤4.2) can be synthesized by a typical carbothermal reduction and nitridation process in a nitrogen atmosphere at atmospheric pressure using SiO$_2$, Al$_2$O$_3$, and carbon as starting materials. A β-sialon powder can be obtained by using a high-temperature nitridation process using a nitriding reaction of a metallic silicon in a nitrogen atmosphere at atmospheric pressure or more, the nitriding reaction being represented by a formula (III) below.

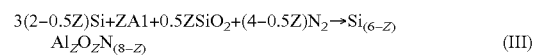
$$3(2-0.5Z)Si + ZAl + 0.5ZSiO_2 + (4-0.5Z)N_2 \rightarrow Si_{(6-Z)}Al_ZO_ZN_{(8-Z)} \quad (III)$$

A Si powder (average particle size: 0.5 to 45 μm, purity: 96% or more, and more preferably 99% or more), a SiO$_2$ powder (average particle size: 0.1 to 20 μm), and an Al powder (average particle size: 1 to 75 μm) are weighed in accordance with a desired Z value, and then mixed with a ball mill, a shaker mixer, or the like to prepare a base powder for synthesizing β-sialon. In this case, besides the components in formula (III) above, AlN or Al$_2$O$_3$ may be used in combination as an Al component, as required. The temperature at which a β-sialon powder is synthesized is preferably 2,300° C. to 2,700° C. The pressure of nitrogen gas filling a container for synthesizing β-sialon is preferably 1.5 MPa or more. A synthesis apparatus capable of withstanding such a gas pressure is suitably a combustion synthesis apparatus or a hot isostatic pressing (HIP) apparatus.

A commercially available α-sialon powder and a commercially available β-sialon powder may be used.

In order to dissolve a metal element M containing at least one selected from the group consisting of calcium, strontium, barium, scandium, yttrium, lanthanoid, manganese, iron, cobalt, nickel, copper, and group IV, group V, and group VI elements of the periodic table in the α-sialon powder or the β-sialon powder, the metal element M and the sialon powder are heat-treated in a temperature range in which diffusion of the metal element M in sialon occurs. For example, a mixture of a powder of the metal element M and the sialon powder is heat-treated by holding in a vacuum of 1 Pa at a temperature of 1,600° C. for one hour, thereby diffusing and dissolving the metal element M in the crystal lattice of sialon. Accordingly, M sialon represented by $M_xSi_{(6-x-z)}Al_zO_zN_{(8-z)}$ (in the formula, relationships of $0.01 \leq x \leq 2$, $0.01 \leq z \leq 4.2$, and $1.79 \leq (6-x-z) \leq 5.98$ are satisfied) can be prepared.

Instead of heat-treating a mixture of a powder of the metal element M and a sialon powder, the metal element M may be added at the same time when sialon is synthesized by using the high-temperature nitridation process. This method also realizes dissolving of the metal element M in the sialon powder and preparation of M sialon represented by the formula $M_xSi_{(6-x-z)}Al_zO_zN_{(8-z)}$.

For the M sialon powder synthesized as described above, X-ray diffraction is performed. After it is confirmed that only diffraction peaks due to M sialon are observed and that diffraction peaks due to the metal element M are not observed, the ratio of metal elements in the M sialon powder is examined by high-frequency inductively coupled plasma emission spectroscopy. Next, the ratio of oxygen element in the M sialon powder is examined by an inert gas fusion non-dispersive infrared absorption method. Furthermore, the ratio of nitrogen element in the M sialon powder is examined by an inert gas fusion-thermal conductivity method. The values of x and z in $M_xSi_{(6-x-z)}Al_zO_zN_{(8-z)}$ can be calculated from these results.

Subsequently, the α-M sialon powder or the β-M sialon powder are treated at a temperature of 1,800° C. to 2,000° C. and a pressure of 40 to 60 GPa. Thus, part of the powder can be subjected to a phase transformation to cubic M sialon. For example, in the case where a impulsive compression process is employed as the treatment, an M sialon powder in which cubic M sialon and α-M sialon or β-M sialon are mixed, or cubic M sialon, α-M sialon, and β-M sialon are mixed can be obtained at a shock pressure of about 40 GPa and at a temperature of 1,800° C. to 2,000° C. In this treatment, the ratio of cubic M sialon in the first hard phase can be controlled by changing the shock pressure and the temperature.

The first hard-phase powder can be prepared by coating the surface of the M sialon powder, in which cubic M sialon and α-M sialon or β-M sialon are mixed or cubic M sialon, α-M sialon, and β-M sialon are mixed, with at least one compound of any of nitrides and carbonitrides of at least one element selected from the group consisting of Ti, Zr, Cr, and Al. In the coating of the surface of the M sialon powder with the compound, a method such as a physical vapor deposition (PVD) method, a ball mill method, or a sol-gel method can be employed.

When the coating with the compound is performed by the PVD method, the surface of the M sialon powder is coated with the compound using an apparatus of vacuum evaporation, ion plating, sputtering, or the like while shaking the M sialon powder. For example, Ti, TiAl, or the like is used as a metal source, and the metal source is allowed to adhere to the surface of the M sialon powder while ions of the metal are allowed to react with nitrogen gas in a nitrogen atmosphere. Thus, the surface of the M sialon powder can be coated with a nitride such as TiN or TiAlN. In this case, the thickness of the coating layer can be controlled by adjusting the treatment time.

When the coating with the compound is performed by the ball mill method, the M sialon powder and a powder of the compound are prepared, and the powders are mixed at an acceleration of about 10 to 150 G using a high acceleration ball mill such as a planetary ball mill. Thus, the surface of the M sialon powder is coated with the compound. In this case, the surface of the M sialon powder can be easily uniformly coated with the compound by charging only the compound powder and milling balls in a pot in advance, preliminarily pulverizing the compound powder by ball-milling, subsequently adding the M sialon powder into the pot, and further performing ball-milling. At an acceleration of less than 10 G, the compound may be still present in the form of a powder, and thus it is difficult to uniformly coat the surface of the M sialon powder with the compound. On the other hand, at an acceleration of more than 150 G, the M sialon powder may be excessively pulverized, which is undesirable. The thickness of the coating layer can be controlled by adjusting the amount of the compound powder charged.

When the coating with the compound is performed by the sol-gel method, a metal component or a metal component and a carbon component are deposited in the form of a sol on the surface of the M sialon powder by a solution process using an alkoxide or the like. Subsequently, the deposit is gelled by heating, and the resulting gel is further heat-treated in a nitrogen atmosphere at about 1,000° C. Thus, the surface of the M sialon powder can be uniformly coated with the compound. The thickness of the coating layer can be controlled by adjusting, for example, the concentration of the alkoxide solution and the time during which the M sialon powder is immersed in the solution.

(Step of Mixing First Hard-phase Powder, Second Hard-Phase Powder, and Binder Powder)

A binder powder containing at least one element selected from the group consisting of Ti, Zr, Al, Ni, and Co and/or at least one of nitrides, carbides, oxides, and carbonitrides of the elements, and solid solutions thereof is added to the first hard-phase powder prepared as described above and a cBN powder having an average particle size of 0.1 to 3 μm, the cBN powder serving as a second hard-phase powder, and these powders are mixed. Examples of the binder powder that is suitably used include metal element powders formed of, for example, Al, Ni, or Co and having an average particle size of 0.01 to 1 μm; intermetallic compound powders formed of, for example, TiAl and having an average particle size of 0.1 to 20 μm; and compound powders formed of TiN, ZrN, TiCN, TiAlN, Ti₂AlN, or Al₂O₃ and having an average particle size of 0.05 to 2 μm. The binder powder is preferably added in an amount of 10% to 40% by volume relative to the total of the first hard-phase powder, the second hard-phase powder, and the binder powder. In an addition amount of the binder powder of less than 10% by volume, the fracture toughness of the sintered body decreases, and a cutting edge of a tool may be easily fractured when the sintered body is used as a cutting tool. In an addition amount of the binder powder of more than 40% by volume, the hardness of the sintered body decreases and wear resistance may be insufficient when the sintered body is used as a cutting tool.

In the mixing, a short-time ball-mill mixing is performed by using, as media, silicon nitride balls or alumina balls having a diameter ϕ of about 3 to 10 mm in a solvent such as ethanol for 12 hours or less, or mixing is performed by using a media-less mixer such as an ultrasonic homogenizer of a wet-type jet mill. Thus, it is possible to obtain a mixed slurry in which the first hard-phase powder, the second hard-phase powder, and the binder powder are uniformly dispersed. In particular, from the viewpoint of maintaining the coating layer on the surface of the M sialon powder without pulverizing the first hard-phase powder obtained by forming the coating layer on the surface of the M sialon powder, the media-less mixer is preferably used. It is also effective to prepare a slurry in advance by sufficiently mixing only the second hard-phase powder and the binder powder using a ball mill or a bead mill, add the slurry to the first hard-phase powder, and perform a short-time ball mill mixing or media-less mixing.

The slurry prepared as described above is dried by natural drying or with a spray dryer or a slurry dryer to obtain a mixed powder.

(Sintering Step)

The mixed powder is compacted by using, for example, an oil hydraulic press. The resulting green compact is then sintered by using a high-pressure generation apparatus such as a belt-type ultrahigh-pressure pressing apparatus at a pressure of 3 to 7 GPa in a temperature range of 1,200° C. to 1,800° C. Prior to the sintering, the green compact of the mixed powder may be presintered, and the presintered compact, which is densified to a certain degree, may be sintered. Alternatively, the green compact may be sintered using a spark plasma sintering (SPS) apparatus by holding the green compact at a pressure of 30 to 200 MPa in a temperature range of 1,200° C. to 1,600° C.

EXAMPLES

Example 1

In order to prepare a first hard-phase powder, a $CeO_2$ powder (manufactured by Shin-Etsu Chemical Co., Ltd., product name: $CeO_2$ fine particles, Grade C, average particle size: 0.6 μm), a Si powder (manufactured by Kojundo Chemical Laboratory Co., Ltd., product name, SIE19PB, purity: 99%, particle size: 45 μm or less), an Al powder (manufactured by Minalco Ltd., product name: 300A, particle size: 45 μm or less), and a $SiO_2$ powder (manufactured by Denka Company Limited, product name: FB-5D, average particle size: 5 μm) were prepared. These powders were blended such that x became 0 to 2.2 and z became 2 in Ce sialon represented by $Ce_xSi_{(6-x-z)}Al_zO_zN_{(8-z)}$, and the resulting mixtures were used as starting materials of Sample Nos. 1-1 to 1-18. Table 1 shows the value of the amount x of the $CeO_2$ powder blended in each of the samples.

In each of Sample Nos. 1-1 to 1-18, 200 g of an NaCl powder was added to 200 g of the starting material for the purpose of the reaction dilution and temperature control. The mixture was charged in a nylon pot in which 500 g of silicon nitride balls having a diameter φ of 6 mm were placed. Dry mixing was performed with a shaker mixer for 30 minutes to prepare a mixed powder for high-temperature nitridation synthesis.

β-Ce sialon was prepared from the mixed powder by a high-temperature nitridation process using a combustion synthesis apparatus. The mixed powder was allowed to stand in a porous carbon crucible with a capacity of 500 mL. Subsequently, pellets of a Ti powder (manufactured by Toho Titanium Co., Ltd., product name: TC450, particle size: 45 μm or less) that were pressed to have a shape with a diameter of 20 mm and a thickness of 5 mm were set on the mixed powder as an ignition material. The crucible was placed on a stage in the combustion synthesis apparatus, and a tungsten wire (manufactured by A. L. M. T. Corp., wire diameter φ: 0.5 mm) serving as an ignition source was then attached between electrodes. The atmosphere in the combustion synthesis apparatus was evacuated with a rotary pump, and JIS Grade 2 high-purity nitrogen gas (purity: 99.99% by volume or more) was then introduced into the combustion synthesis apparatus so that the nitrogen gas pressure in the apparatus was increased to 3 MPa. In the start of a synthesis reaction, the tungsten wire was allowed to be incandescent by increasing the voltage between the electrodes to ignite the titanium pellets. The heat of the reaction was propagated to the mixed powder to cause a self-combustion reaction of β-Ce sialon. At that time, the reaction temperature measured with a two-color radiation thermometer was 2,500° C.

The reaction product synthesized as described above was taken out from the apparatus. Agglomeration of the reaction product was pulverized with an alumina mortar, and NaCl was then removed in pure water. The crystal phase of the reaction product after the removal of NaCl was identified by using an X-ray diffractometer (manufactured by Rigaku Corporation, MiniFlex600, Cu-Kα radiation, 2θ-θ method, voltage x current: 45 kV×15 mA, measurement range: 2θ=20° to 100°, scan step: 0.02°, scan speed: 1 step/sec). According to the results, all the diffraction peaks coincided

TABLE 1

| Sample No. | Amount x of $CeO_2$ powder blended | $R_c$ of first hard-phase powder | Method for forming coating layer of first hard-phase powder | Blending ratio of binder powder (Volume %) | Blending ratio of total of first hard-phase powder and second hard-phase powder (Volume %) | Volume of second hard-phase powder/ volume of first hard-phase powder |
|---|---|---|---|---|---|---|
| 1-1 | 0 | 0.65 | Sputtering | 20 | 80 | 1 |
| 1-2 | 0.1 | 0.65 | Sputtering | 20 | 80 | 1 |
| 1-3 | 1.8 | 0.65 | Sputtering | 20 | 80 | 1 |
| 1-4 | 2.2 | 0.65 | Sputtering | 20 | 80 | 1 |
| 1-5 | 0.5 | 0.23 | Sputtering | 20 | 80 | 1 |
| 1-6 | 0.5 | 0.25 | Sputtering | 20 | 80 | 1 |
| 1-7 | 0.5 | 0.65 | Sputtering | 20 | 80 | 1 |
| 1-8 | 0.5 | 0.95 | Sputtering | 20 | 80 | 0.5 |
| 1-9 | 0.5 | 0.95 | Sputtering | 20 | 80 | 0.3 |
| 1-10 | 0.5 | 0.95 | Sputtering | 10 | 90 | 6.7 |
| 1-11 | 0.5 | 0.95 | Sputtering | 20 | 80 | 7.2 |
| 1-12 | 0.5 | 0.95 | Ball mill | 5 | 95 | 3 |
| 1-13 | 0.5 | 0.95 | Ball mill | 35 | 65 | 3 |
| 1-14 | 0.5 | 0.95 | Ball mill | 45 | 55 | 3 |
| 1-15 | 0.5 | 0.90 | Ball mill | 20 | 80 | 4 |
| 1-16 | 0.5 | 0.70 | Ball mill | 20 | 80 | 4 |
| 1-17 | 0.5 | 0.60 | Ball mill | 20 | 80 | 2 |
| 1-18 | 0.5 | 0.95 | — | 20 | 80 | 1 | with β-Ce$_x$Si$_{4-x}$Al$_2$O$_2$N$_6$, (JCPDS card: 01-077-0755). It was concluded that β-Ce sialon where Z=2 could be synthesized.

Since the β-Ce sialon powder synthesized by high-temperature nitridation was agglomerated, the agglomerated powder was roughly pulverized with an alumina mortar until secondary particles have a size of 150 μm or less, and the powder was then pulverized by crushing with a ball mill.

In a polystyrene pot having a capacity of 2 L, 200 g of the β-Ce sialon powder synthesized by high-temperature nitridation, 600 mL of ethanol, and 2 kg of silicon nitride balls having a diameter φ of 5 mm were enclosed. For each of Sample Nos. 1-1 to 1-18, wet-ball milling was performed for five hours to obtain a dispersion slurry. The dispersion slurry was naturally dried, and the dried powder was then allowed to pass through a sieve having an opening of 45 μm to prepare a raw material for shock-synthesizing cubic Ce sialon.

Next, 500 g of the β-Ce sialon powder and 9,500 g of a copper powder acting as a heat sink were mixed, and the mixture was enclosed in a steel pipe. The mixture was then subjected to an impulsive compression by using an explosive, the amount of which was determined so that the temperature became 1,900° C. and a shock pressure became 40 GPa, to synthesize cubic Ce sialon. After the impulsive compression, the mixed powder in the steel pipe was taken out, and the copper powder was removed by acid washing to obtain a synthesized powder. The synthesized powder was analyzed by using an X-ray diffractometer (manufactured by Rigaku Corporation, MiniFlex600, Cu-Kα radiation, 2θ-θ method, voltage×current: 45 kV×15 mA, measurement range: 2θ=20° to 100°, scan step: 0.02°, scan speed: 1 step/sec). According to the results, cubic Ce sialon (JCPDS card: 01-074-3494) and β-Ce sialon (JCPDS card: 01-077-0755) were identified. A peak intensity $I_{c(311)}$ of a (311) plane, which is due to a main peak of cubic Ce sialon, and a peak intensity $I_{β(200)}$ of a (200) plane, which is due to a main peak of β-Ce sialon, were determined from an X-ray diffraction pattern of the synthesized powder, and $R_c$ was calculated from the formula (II). According to the results, $R_c$ was 0.95.

For the synthesized powder having an $R_c$ of 0.95 and synthesized by the impulsive compression as described above, the ratio of metal elements in the Ce sialon powder was examined by high-frequency inductively coupled plasma emission spectroscopy using an ICP emission spectrometer (manufactured by Thermo Fisher Scientific Inc., iCAP6500 DUO). Next, the ratio of oxygen element in the Ce sialon powder was examined by an inert gas fusion non-dispersive infrared absorption method using an oxygen/nitrogen elemental analyzer (manufactured by LECO Japan Corporation, ONH836). Furthermore, the ratio of nitrogen element in the Ce sialon powder was examined by an inert gas fusion-thermal conductivity method. The results showed that in each of Sample Nos. 1-1 to 1-18, the values of x and z in the starting material were substantially equal to the values of x and z of the synthesized powder.

Predetermined amounts of a β-Ce sialon powder was added to the synthesized powder having an $R_c$ of 0.95 and synthesized by the impulsive compression as described above to prepare Ce sialon powders used for the preparation of sintered bodies of Sample Nos. 1-1 to 1-7 and 1-15 to 1-17. Table 1 shows the results of $R_c$ of the Ce sialon powders of Sample Nos. 1-1 to 1-7 and 1-15 to 1-17, the $R_c$ being measured by using the X-ray diffractometer. Regarding Sample Nos. 1-8 to 1-14 and 1-18, the β-Ce sialon powder was not added, and the synthesized powder having an $R_c$ of 95% and synthesized by the impulsive compression was used without further treatment.

In order to prepare the first hard-phase powder, a TiN coating layer was formed on the surfaces of the Ce sialon powders of Sample Nos. 1-1 to 1-17. In contrast, no TiN coating layer was formed on the Ce sialon powder of Sample No. 1-18.

The coating layer of each of the first hard-phase powders used in Sample Nos. 1-1 to 1-11 was formed by a sputtering method. In this case, sputtering was performed by using pure Ti (purity 99.9%) as a target while shaking 100 g of the Ce sialon powder in an atmosphere of JIS Grade 1 high-purity nitrogen. Thus, a TiN coating layer was formed on the surface of the Ce sialon powder to prepare the first hard-phase powder. The first hard-phase powder was embedded in a thermosetting resin, and a cross-sectional sample for measuring the thickness of the coating layer was then prepared by using a CP device. According to the result of the observation of the sample with an FE-SEM, the TiN coating layer had a thickness of 0.05 μm.

The coating layer of each of the first hard-phase powders used in Sample Nos. 1-12 to 1-17 was formed by a ball mill method. In this case, 50 g of the Ce sialon powder, 25 g of a pure Ti powder (manufactured by Toho Titanium Co., Ltd., product name: TC-459) having a particle size of 20 μm or less, and 100 g of cemented carbide balls coated with TiN and having a diameter φ of 6 mm were enclosed in a cemented carbide pot having a capacity of 200 cc. The atmosphere in the pot was replaced with JIS Grade 1 high-purity nitrogen, and mixing was then performed using a planetary ball mill. In the planetary ball milling, rotation was conducted at a centrifugal force of 15 G for 10 minutes, nitrogen gas was then added into the pot to replenish nitrogen decreased by nitridation of Ti, and mixing was started again. This treatment was repeated 10 times to prepare the first hard-phase powder. The first hard-phase powder was embedded in a thermosetting resin, and a cross-sectional sample for measuring the thickness of the coating layer was then prepared by using a CP device. According to the result of the observation of the sample with an FE-SEM, the TiN coating layer had a thickness of 0.4 μm.

A cBN powder (manufactured by Showa Denko K.K., product name: SBN-T G1-3) having an average particle size of 2 μm was used as a second hard-phase powder.

For each of Sample Nos. 1-1 to 1-17, a Ti$_3$Al powder (average particle size: 2 μm) was added as a binder at the ratio shown in Table 1 to a total amount of 30 g of the first hard-phase powder and the second hard-phase powder. The addition amount (volume %) of the binder powder shown in Table 1 is a volume ratio of the binder powder to the total amount of the first hard-phase powder, the second hard-phase powder, and the binder powder. In this step, for each of Sample Nos. 1-1 to 1-17, the first hard-phase powder and the second hard-phase powder were blended such that the ratio of the volume of the second hard-phase powder to the volume of the first hard-phase powder became the value shown in Table 1. Each of the powders of Sample Nos. 1-1 to 1-17 after blending was charged in a polystyrene pot having a capacity of 150 mL together with 60 mL of ethanol and 200 g of silicon nitride balls having a diameter φ of 6 mm. A ball mill mixing was performed for 12 hours to prepare a slurry.

The slurry taken out from the pot was naturally dried, and the dried product was then allowed to pass through a sieve having an opening of 45 μm to prepare a powder for sintering.

For comparison, the Ti₃Al powder was added as a binder at the ratio shown in Table 1 to a total amount of 30 g of the Ce sialon powder having no coating layer and the second hard-phase powder. In this step, blending was performed such that the ratio of the volume of the second hard-phase powder to the volume of the Ce sialon powder having no coating layer became 1. The powder after blending was subjected to a ball mill mixing, natural drying, and sieving as in Sample Nos. 1-1 to 1-17 to prepare a powder for sintering of Sample No. 1-18.

Each of the powders for sintering of Sample Nos. 1-1 to 1-18 prepared as described above was vacuum-sealed in a high-melting point metal capsule having a diameter b of 20 mm. The capsule was then heated to a temperature of 1,500° C. while supplying electricity and applying a pressure of 5 GPa using a belt-type ultrahigh-pressure pressing apparatus to prepare a sintered body.

A cross section of the sintered body was mirror-polished by using a CP device. Elements constituting the crystal particles of the structure of the cross section were then examined by using an electron probe microanalyzer (EPMA) to specify the particles of the first hard phase. Elements of Ce, Si, Al, O, and N constituting Ce sialon in the first hard particles were quantitatively analyzed. The results showed that in each of Sample Nos. 1-1 to 1-18, the values of x and z in the synthesized powder were substantially equal to the values of x and z of the sintered body.

A sample for measuring thermal conductivity, the sample having a diameter of 18 mm and a thickness of 1 mm, was cut out from the sintered body. The specific heat and thermal diffusivity of the sample were measured by using a laser flash method thermal constant measuring device (manufactured by NETZSCH, LFA447). The thermal conductivity was calculated by multiplying the thermal diffusivity by the specific heat and the density of the sintered body. Table 2 shows the results.

A cross section of the sintered body was mirror-polished by using a CP device. The cross section was then observed by using an FE-SEM to measure the thickness of the coating layer. In each of the sintered bodies of samples No. 1-1 to 1-17, the thickness of the coating layer hardly changed before and after sintering. The thickness of the coating layer of the sintered body was substantially equal to the thickness of the coating layer measured when only the first hard-phase powder was embedded in the resin.

A cross section of the sintered body was mirror-polished by using a CP device, and the structure of the sintered body was then observed by using an FE-SEM. Elements constituting crystal particles of the structure were examined by using EDX attached to the FE-SEM to specify the particles of the first hard phase, the second hard phase, and the binder in the SEM image. The SEM image was processed by using WinROOF available from Mitani Corporation to determine an area ratio of the first hard particle, the second hard particle, and the binder. The area ratio is considered to be a volume ratio. The volume ratio of the first hard particles, the second hard particles, and the binder contained in the sintered body was specified by the above method. Table 2 shows the results.

The surface of the sintered body was subjected to flat grinding by using a #400 diamond grinding wheel, and X-ray diffraction of the ground surface was then performed by using the X-ray diffractometer. From a diffraction pattern of the X-ray diffraction of the ground surface, the peak intensity $I_{c(311)}$ of a (311) plane of cubic Ce sialon, the peak intensity $I_{\beta(200)}$ of a (200) plane of β-Ce sialon, and the peak intensity $I_{s(300)}$ of a (300) plane of SiO₂ (JCPDS card: 01-073-3440) were determined, and $R_s$ was calculated from the formula (I). Table 2 shows the results. In the sintered body of Sample No. 1-18, in which the surface of the Ce sialon powder was not coated with TiN, $R_s$ significantly increased compared with those of the sintered bodies of Sample Nos. 1-1 to 1-17, in which the surface of the Ce sialon powder was coated with TiN.

The peak intensity $I_{c(311)}$ of a (311) plane of cubic Ce sialon and the peak intensity $I_{\beta(200)}$ of a (200) plane of β-Ce sialon were determined from the diffraction pattern of the X-ray diffraction of the ground surface, and a ratio $R_c$ of these intensities ($I_{c(311)}/(I_{c(311)}+I_{\beta(200)})$) was calculated. Table 2 shows the results. In the sintered bodies of Sample Nos. 1-1 to 1-17, in which the surface of the Ce sialon powder was coated with TiN, the change in the value of $R_c$

TABLE 2

| Sample No. | Thermal conductivity of sintered body (W/m·K) | Volume of second hard-phase particles/ volume of first hard-phase particles in sintered body | Total content of first hard-phase particles and second hard-phase particles in sintered body (Volume %) | $R_s$ of sintered body | $R_c$ of sintered body | Mechanical properties of sintered body | | Results of outside-diameter cylindrical turning test | |
|---|---|---|---|---|---|---|---|---|---|
| | | | | | | Vickers hardness (GPa) | Fracture toughness (MPa·m^{1/2}) | Tool life (km) | Life factor |
| 1-1 | 70 | 1.1 | 78 | 0.12 | 0.6 | 24.0 | 5.5 | 0.1 | Fracture |
| 1-2 | 45 | 1.1 | 77 | 0.14 | 0.6 | 23.8 | 5.6 | 0.6 | Wear |
| 1-3 | 53 | 1.2 | 76 | 0.13 | 0.6 | 23.6 | 5.7 | 0.6 | Wear |
| 1-4 | 62 | 1.2 | 75 | 0.13 | 0.6 | 23.0 | 5.2 | 0.3 | Fracture |
| 1-5 | 40 | 1.5 | 70 | 0.12 | 0.18 | 21.5 | 5.4 | 0.3 | Wear |
| 1-6 | 35 | 1.4 | 76 | 0.14 | 0.23 | 22.5 | 5.6 | 0.6 | Wear |
| 1-7 | 32 | 1.2 | 78 | 0.13 | 0.60 | 24.0 | 5.8 | 0.8 | Wear |
| 1-8 | 27 | 0.6 | 79 | 0.18 | 0.89 | 22.5 | 5.4 | 0.6 | Wear |
| 1-9 | 14 | 0.4 | 80 | 0.22 | 0.88 | 22.4 | 4.8 | 0.3 | Fracture |
| 1-10 | 55 | 6.8 | 88 | 0.26 | 0.90 | 30.0 | 6.1 | 0.6 | Wear |
| 1-11 | 65 | 7.4 | 78 | 0.28 | 0.90 | 32.0 | 6.4 | 0.2 | Fracture |
| 1-12 | 53 | 3.2 | 95 | 0.14 | 0.90 | 28.0 | 4.8 | 0.3 | Fracture |
| 1-13 | 51 | 3.3 | 63 | 0.22 | 0.89 | 22.6 | 6.8 | 0.6 | Wear |
| 1-14 | 45 | 3.5 | 54 | 0.28 | 0.88 | 20.5 | 7.5 | 0.3 | Wear |
| 1-15 | 14 | 4.3 | 76 | 0.24 | 0.85 | 31.0 | 5.4 | 0.7 | Fracture |
| 1-16 | 18 | 4.2 | 77 | 0.22 | 0.65 | 26.0 | 5.6 | 0.9 | Wear |
| 1-17 | 40 | 2.1 | 79 | 0.16 | 0.55 | 23.0 | 6.1 | 0.6 | Wear |
| 1-18 | 35 | 1.3 | 76 | 0.34 | 0.31 | 22.5 | 3.8 | 0.1 | Fracture | before and after sintering was small. In contrast, in the sintered body of Sample No. 1-18, in which the surface of the Ce sialon powder was not coated with TiN, the value of $R_c$ was significantly decreased by sintering.

A sample for measuring a hardness was cut from the sintered body, and embedded in a Bakelite resin. The sample was then polished using diamond abrasive grains having a size of 9 µm for 30 minutes and diamond abrasive grains having a size of 3 µm for 30 minutes. A diamond indenter was pressed onto the polished surface of the sample at a load of 10 kgf using a Vickers hardness tester (manufactured by AKASHI, HV-112). The Vickers hardness $H_{v10}$ was determined from an indentation formed by pressing the diamond indenter. Furthermore, the length of a crack propagating from the indentation was measured to determine a value of fracture toughness by the IF method in accordance with JIS R 1607 (Testing methods for fracture toughness of fine ceramics at room temperature). Table 2 shows the results.

Next, the sintered body was machined to have a CNGA120408-type brazing insert shape. The tool life of the brazing insert in turning of Inconel 713C (manufactured by Special Metals Corporation, registered trademark) was evaluated. An outside-diameter cylindrical turning test was performed under the conditions described below. A cutting distance at which either the amount of wear of the flank face or the amount of fracture of the cutting edge of the tool reached earlier 0.2 mm was determined. This cutting distance was defined as the tool life (km). Table 2 shows the results. Table 2 also shows a life factor, which represents whether the cause of reaching the tool life is due to wear or fracture.

<Cutting Conditions>
Workpiece: Inconel 713C
Tool shape: CNGA120408 (ISO model number)
Cutting edge shape: chamfer angle −20°×width 0.1 mm
Cutting speed: 200 m/min
Depth of cut: 0.2 mm
Feed speed: 0.1 mm/rev.
Wet condition (water-soluble oil agent)

In Sample No. 1-1, since the sintered body contained first hard particles formed of cubic and β-sialon in which Ce was not dissolved, thermal conductivity of the sintered body was as high as 70 W/m·K. As a result, with a decrease in the cutting-edge temperature of the tool during cutting, the cutting force increased. This increase in the cutting force was combined with an increase in boundary failure of the cutting edge, and the tool reached the tool life due to fracture at a cutting distance of 0.1 km. In particular, since Inconel 713C has a large crystal grain size, the tool life tends to significantly decrease due to boundary failure as compared with Inconel 718 and the like.

In Sample No. 1-4, the amount x of Ce element dissolved in cubic and β-sialon was excessive, i.e., 2.2, and thus thermal conductivity of the sintered body instead increased to 62 W/m·K. As a result, with a decrease in the cutting-edge temperature of the tool during cutting, the cutting force increased. This increase in the cutting force was combined with an increase in boundary damage of the cutting edge, and the tool reached the tool life due to fracture at a cutting distance of 0.3 km.

In Sample No. 1-5, since $R_c$ of the first hard phase of the sintered body was as low as 0.18 and the ratio of cubic Ce sialon contained in the first hard phase was low, the Vickers hardness was only 21.5 GPa. Consequently, the tool reached the tool life due to wear at a cutting distance of 0.3 km.

In Sample No. 1-9, since the ratio of the volume of the second hard particles to the volume of the first hard particles in the sintered body was as low as 0.4, the fracture toughness was only 4.8 MPa·m$^{1/2}$. Consequently, the tool reached the tool life due to fracture at a cutting distance of 0.3 km.

In Sample No. 1-11, since the ratio of the volume of the second hard particles to the volume of the first hard particles in the sintered body was as high as 7.4, the thermal conductivity was 65 W/m·K. As a result, with a decrease in the cutting-edge temperature of the tool during cutting, the cutting force increased. This increase in the cutting force was combined with an increase in boundary failure of the cutting edge, and the tool reached the tool life due to fracture at a cutting distance of 0.2 km.

In Sample No. 1-12, since the total content of the first hard particles and the second hard particles in the sintered body was as high as 95% by volume, the fracture toughness was 4.8 MPa·m$^{1/2}$. Consequently, the tool reached the tool life due to fracture of the cutting edge of the tool at a cutting distance of 0.3 km.

In Sample No. 1-14, since the total content of the first hard particles and the second hard particles in the sintered body was as low as 54% by volume, the Vickers hardness was only 20.5 GPa. Consequently, the tool reached the tool life due to wear at a cutting distance of 0.3 km.

In contrast, in Sample Nos. 1-2, 1-3, 1-6 to 1-8, 1-10, 1-13, and 1-15 to 1-17, in which $R_c$ of the first hard phase of the sintered body, the ratio of the volume of the second hard particles to the volume of the first hard particles in the sintered body, and the total content of the first hard particles and the second hard particles in the sintered body were controlled to appropriate ranges, the Vickers hardness and the fracture toughness could be well balanced. Consequently, the cutting distance at which the tool reached the tool life due to wear or fracture could be extended to 0.6 km or more.

In contrast, in Sample No. 1-18, which was prepared by using a Ce sialon powder having no coating layer, $R_c$ of the sintered body decreased to 0.31. In addition, $R_s$ of the sintered body increased to 0.34, and the fracture toughness was as low as 3.8 MPa·m$^{1/2}$. Consequently, the tool reached the tool life due to fracture of the cutting edge of the tool at a cutting distance of 0.1 km.

Example 2

In order to prepare a first hard-phase powder, a Ti powder (manufactured by Toho Titanium Co., Ltd., product name: TC-200, average particle size: 17 µm), a Si powder (manufactured by Kojundo Chemical Laboratory Co., Ltd., product name, SIE19PB, purity: 99%, particle size: 45 µm or less), an Al powder (manufactured by Minalco Ltd., product name: 300A, particle size: 45 µm or less), and a $SiO_2$ powder (manufactured by Denka Company Limited, product name: FB-5D, average particle size: 5 µm) were prepared. These powders were blended such that x became 0.2 and z became 2 in Ti sialon represented by $Ti_xSi_{(6-x-z)}Al_zO_zN_{(8-z)}$, and the resulting mixture was used as a starting material of Sample Nos. 2-1 to 2-16. Titanium sialon represented by $Ti_{0.2}Si_{3.8}Al_2O_2N_6$ having an $R_c$ of 0.95 was synthesized as in Example 1 except that the Ti powder was used instead of the $CeO_2$ powder.

In order to prepare the first hard-phase powder, a powder of the Ti sialon was prepared, and a coating layer formed of the material shown in Table 3 was formed on the surface of the Ti sialon powder for each of Sample Nos. 2-1 to 2-15.

TABLE 3

| | Coating layer of first hard-phase powder | | | |
|---|---|---|---|---|
| Sample No | Material | Formation method | Layer Thickness (μm) | Material of binder powder |
| 2-1 | TiN | Sputtering | 0.005 | $Ti_3Al$ |
| 2-2 | TiN | Sputtering | 0.02 | $Ti_3Al$ |
| 2-3 | TiN | Sputtering | 0.25 | $Ti_3Al$ |
| 2-4 | TiN | Sputtering | 1.8 | $Ti_3Al$ |
| 2-5 | TiN | Sputtering | 2.3 | $Ti_3Al$ |
| 2-6 | TiAlN | Sputtering | 0.15 | $Ti_3Al$ |
| 2-7 | TiZrN | Sputtering | 0.11 | $Ti_3Al$ |
| 2-8 | AlN | Sputtering | 0.25 | $Ti_3Al$ |
| 2-9 | AlCrN | Sputtering | 0.36 | $Ti_3Al$ |
| 2-10 | TiCN | Ball mill | 0.25 | Ti |
| 2-11 | TiCN | Ball mill | 0.25 | TiN + Al |
| 2-12 | TiCN | Ball mill | 0.25 | $Ti_2AlN$ |
| 2-13 | TiCN | Ball mill | 0.25 | $Al_2O_3$ |
| 2-14 | TiCN | Ball mill | 0.25 | Co |
| 2-15 | TiCN | Ball mill | 0.25 | ZrN |
| 2-16 | — | — | — | Co |

The coating layer of each of the first hard-phase powders used in Sample Nos. 2-1 to 2-9 was formed by a sputtering method. In this case, sputtering was performed by using any of pure Ti (purity 99.9%), a TiAl alloy (purity 99.9%), a TiZr alloy (purity 99%), pure Al (purity 99.9%), and an AlCr alloy (purity 99%) as a target, while shaking 200 g of the Ti sialon powder in an atmosphere of JIS Grade 1 high-purity nitrogen. Thus, a coating layer of the material shown in Table 3 was formed on the surface of the Ti sialon powder to prepare the first hard-phase powder. Regarding Sample Nos. 2-1 to 2-5, the thickness of the TiN coating layer on the surface of the Ti sialon powder was changed by adjusting the sputtering time. The first hard-phase powder was embedded in a thermosetting resin, and a cross-sectional sample for measuring the thickness of the coating layer was then prepared by using a CP device. According to the results of the observation of the samples with an FE-SEM, the coating layers of Sample Nos. 2-1 to 2-9 had the thicknesses (layer thickness) shown in Table 3.

The coating layer of each of the first hard-phase powders used in Sample Nos. 2-10 to 2-15 was formed by a ball mill method. First, 13 g of a TiCN powder (manufactured by Japan New Metal Co., Ltd., product name: TiN—TiC 50/50, average particle size: 1 μm) and 100 g of cemented carbide balls coated with TiN and having a diameter of φ6 mm were enclosed in a cemented carbide pot having a capacity of 200 cc. The atmosphere in the pot was replaced with JIS Grade 1 high-purity nitrogen, and the TiCN powder was then preliminarily pulverized for 60 minutes using a planetary ball mill with a centrifugal force of 15 G. Subsequently, 50 g of the Ti sialon powder was additionally charged in the pot. The atmosphere in the pot was again replaced with JIS Grade 1 high-purity nitrogen, and mixing was performed for 60 minutes by using a planetary ball mill with a centrifugal force of 15 G to prepare the first hard-phase powder. The first hard-phase powder was embedded in a thermosetting resin, and a cross-sectional sample for measuring the thickness of the coating layer was then prepared by using a CP device. According to the result of the observation of the sample with an FE-SEM, the TiCN coating layer had a thickness of 0.25 μm.

A cBN powder the same as that used in Example 1 was prepared as the second hard-phase powder. For each of Sample Nos. 2-1 to 2-15, the binder powder shown in Table 3 was blended with a total amount of 30 g of the first hard-phase powder and the second hard-phase powder such that the volume ratio of the binder powder to the total amount of the first hard-phase powder, the second hard-phase powder, and the binder powder became 20% by volume. In this step, for each of Sample Nos. 2-1 to 2-15, the first hard-phase powder and the second hard-phase powder were blended such that the ratio of the volume of the second hard-phase powder to the volume of the first hard-phase powder became 1. As the binder powder, a $Ti_3Al$ powder (average particle size: 2 μm), a Ti powder (manufactured by Toho Titanium Co., Ltd., prepared by pulverizing product name: TC-459 with a wet-type ball mill until the average particle size became 5 μm), a mixed powder of a TiN powder and an Al powder (prepared by blending product name: TiN-1 having an average particle size of 1 μm and manufactured by Japan New Metal Co., Ltd. and product name: 900F having an average particle size of 2.5 μm and manufactured by Minalco Ltd. at a mass ratio of 4:1), a $Ti_2AlN$ powder (average particle size: 1 μm), an $Al_2O_3$ powder (manufactured by Taimei Chemicals Co., Ltd., product name: TM-D), a Co powder (manufactured by Umicore, product name: HMP), and a ZrN powder (manufactured by Japan New Metal Co., Ltd., product name: ZrN-1) were used. Each of the powders of Sample Nos. 2-1 to 2-15 after blending was charged in a polystyrene pot having a capacity of 150 mL together with 60 mL of ethanol and 200 g of silicon nitride balls having a diameter φ of 6 mm. A ball mill mixing was performed for 12 hours to prepare a slurry. The slurry taken out from the pot was naturally dried, and the dried product was then allowed to pass through a sieve having an opening of 45 μm to prepare a powder for sintering.

For comparison, the Co powder was blended as a binder powder with a total amount of 30 g of the Ti sialon powder having no coating layer and having an $R_c$ of 95% and the second hard-phase powder. In this step, these powders were mixed such that the volume ratio of the binder powder to the total amount of the first hard-phase powder, the second hard-phase powder, and the binder powder became 20% by volume. In addition, the blending was performed such that the ratio of the volume of the second hard-phase powder to the volume of the Ti sialon powder having no coating layer became 1. The powder after blending was subjected to a ball mill mixing, natural drying, and sieving as in Sample Nos. 2-1 to 2-15 to prepare a powder for sintering of Sample No. 2-16.

Each of the powders for sintering of Sample Nos. 2-1 to 2-16 prepared as described above was vacuum-sealed in a high-melting point metal capsule having a diameter 4 of 20 mm. The capsule was then heated to a temperature of 1,500° C. while supplying electricity and applying a pressure of 5 GPa using a belt-type ultrahigh-pressure pressing apparatus to prepare a sintered body.

A cross section of the sintered body was mirror-polished by using a CP device. Elements constituting the crystal particles of the structure of the cross section were then examined by EPMA to specify the particles of the first hard phase. Elements of Ti, Si, Al, O, and N constituting Ti sialon in the first hard particles were quantitatively analyzed. The results showed that in each of Sample Nos. 2-1 to 2-16, the values of x and z in the synthesized powder were substantially equal to the values of x and z of the sintered body.

A sample for measuring thermal conductivity, the sample having a diameter of 18 mm and a thickness of 1 mm, was cut out from the sintered body. The specific heat and thermal diffusivity of the sample were measured by using a laser flash method thermal constant measuring device (manufactured by NETZSCH, LFA447). The thermal conductivity was calculated by multiplying the thermal diffusivity by the specific heat and the density of the sintered body. Table 4 shows the results.

toughness of each of the sintered bodies of Sample Nos. 2-1 to 2-16 were measured as in Example 1. Table 4 shows the results.

TABLE 4

| Sample No. | Thermal conductivity of sintered body (W/m·K) | Volume of second hard-phase particles/ volume of first hard-phase particles in sintered body | Total content of first hard-phase particles and second hard-phase particles in sintered body (Volume %) | $R_s$ of sintered body | $R_c$ of sintered body | Mechanical properties of sintered body | | Results of outside-diameter cylindrical turning test | |
|---|---|---|---|---|---|---|---|---|---|
| | | | | | | Vickers hardness (GPa) | Fracture toughness (MPa + m$^{1/2}$) | Tool life (km) | Life factor |
| 2-1 | 32 | 1.5 | 75 | 0.29 | 0.52 | 23.5 | 4.5 | 0.3 | Fracture |
| 2-2 | 34 | 1.3 | 77 | 0.23 | 0.75 | 24.6 | 5.2 | 0.6 | Fracture |
| 2-3 | 40 | 1.2 | 77 | 0.19 | 0.78 | 24.3 | 5.8 | 0.8 | Fracture |
| 2-4 | 43 | 1.1 | 78 | 0.17 | 0.86 | 22.0 | 6.0 | 0.6 | Wear |
| 2-5 | 50 | 1.0 | 79 | 0.13 | 0.92 | 21.7 | 5.7 | 0.4 | Wear |
| 2-6 | 45 | 1.0 | 70 | 0.15 | 0.75 | 24.8 | 6.1 | 0.8 | Fracture |
| 2-7 | 32 | 1.1 | 78 | 0.17 | 0.72 | 24.9 | 6.3 | 0.7 | Fracture |
| 2-8 | 53 | 1.0 | 79 | 0.11 | 0.83 | 23.3 | 6.4 | 0.9 | Wear |
| 2-9 | 21 | 1.1 | 77 | 0.22 | 0.76 | 24.8 | 6.7 | 0.8 | Wear |
| 2-10 | 43 | 1.0 | 79 | 0.20 | 0.88 | 25.2 | 5.1 | 0.7 | Wear |
| 2-11 | 22 | 1.0 | 79 | 0.15 | 0.89 | 25.0 | 5.5 | 0.8 | Fracture |
| 2-12 | 34 | 1.1 | 77 | 0.13 | 0.65 | 22.6 | 7.3 | 0.5 | Wear |
| 2-13 | 45 | 1.1 | 78 | 0.19 | 0.72 | 24.0 | 5.5 | 0.6 | Fracture |
| 2-14 | 56 | 1.2 | 76 | 0.24 | 0.55 | 25.4 | 7.3 | 0.5 | Wear |
| 2-15 | 34 | 1.1 | 78 | 0.18 | 0.78 | 24.1 | 7.4 | 0.6 | Wear |
| 2-16 | 58 | 1.6 | 74 | 0.35 | 0.23 | 20.5 | 3.7 | 0.1 | Fracture |

A cross section of the sintered body was mirror-polished by using a CP device. The cross section was then observed by using an FE-SEM to measure the thickness of the coating layer. The thickness of the coating layer hardly changed before and after sintering. The thickness of the coating layer of the sintered body was substantially equal to the thickness of the coating layer measured when only the first hard-phase powder was embedded in the resin.

A cross section of the sintered body was mirror-polished by using a CP device, and the volume ratio of the first hard particles, the second hard particles, and the binder contained in the sintered body was specified by the same method as that used in Example 1. Table 4 shows the results.

The surface of the sintered body was subjected to flat grinding by using a #400 diamond grinding wheel, and X-ray diffraction of the ground surface was then performed by using the X-ray diffractometer. $R_s$ of the sintered body was determined from the X-ray diffraction intensity values as in Example 1. Table 4 shows the results. The results of Sample Nos. 2-1 to 2-5 showed that with an increase in the thickness of the coating layer formed on the surface of the Ti sialon powder, $R_s$ of the sintered body decreased. In contrast, in the sintered body of Sample No. 2-16, in which the surface of the Ti sialon powder was not subjected to coating, $R_s$ significantly increased.

The peak intensity $I_{c(311)}$ of a (311) plane of cubic Ti sialon and the peak intensity $I_{\beta(200)}$ of a (200) plane of β-Ti sialon were determined from the diffraction pattern of the X-ray diffraction of the ground surface, and a ratio $R_c$ of these intensities ($I_{c(311)}/(I_{c(311)}+I_{\beta(200)})$) was calculated. Table 4 shows the results. The results of Sample Nos. 2-1 to 2-5 showed that with an increase in the thickness of the coating layer formed on the surface of the Ti sialon powder, $R_c$ of the sintered body increased. In contrast, in the sintered body of Sample No. 2-16, in which the surface of the Ti sialon powder was not subjected to coating, the value of $R_c$ was significantly increased by sintering.

A sample for measuring a hardness was cut out from the sintered body. The Vickers hardness $H_{v10}$ and the fracture Next, the sintered body was machined to have a CNGA120408-type brazing insert shape. The tool life of the brazing insert in turning of Hastelloy X was evaluated. An outside-diameter cylindrical turning test was performed under the conditions described below. A cutting distance at which either the amount of wear of the flank face or the amount of fracture of the cutting edge of the tool reached earlier 0.2 mm was determined. This cutting distance was defined as the tool life (km). Table 4 shows the results. Table 4 also shows the life factor, which represents whether the cause of reaching the tool life is due to wear or fracture.

<Cutting Conditions>
Workpiece: Hastelloy X
Tool shape: CNGA120408 (ISO model number)
Cutting edge shape: chamfer angle −20°×width 0.1 mm
Cutting speed: 300 m/min
Depth of cut: 0.2 mm
Feed speed: 0.1 mm/rev.
Wet condition (water-soluble oil agent)

In Sample No. 2-1, since the thickness of the TiN coating layer on the surfaces of the Ti sialon particles constituting the first hard particles of the sintered body was as small as 0.005 µm, $R_c$ in the sintered body decreased to 0.52 and $R_s$ of the sintered body increased to 0.29. Consequently, the fracture toughness decreased to 4.5 MPa·m$^{1/2}$, and boundary failure of the cutting edge increased. The tool reached the tool life due to fracture of the cutting edge of the tool at a cutting distance of 0.3 km.

In Sample No. 2-5, since the thickness of the TiN coating layer on the surfaces of the Ti sialon particles constituting the first hard particles of the sintered body was as large as 2.3 µm, the Vickers hardness was only 21.7 GPa. Consequently, the tool reached the tool life due to wear at a cutting distance of 0.4 km.

In contrast, in Sample Nos. 2-2 to 2-4 and 2-6 to 2-15, in which the thickness of the coating layer on the surfaces of the Ti sialon particles constituting the first hard particles of the sintered body was controlled to an appropriate range, the thermal conductivity and the Vickers hardness could be well balanced. Consequently, the cutting distance at which the tool reached the tool life due to wear or fracture could be extended to 0.5 km or more.

In contrast, in Sample No. 2-16, which was prepared by using a Ti sialon powder having no coating layer, $R_c$ of the sintered body decreased to 0.23, and $R_s$ of the sintered body increased to 0.35. Consequently, the fracture toughness was decreased to 3.7 MPa·m$^{1/2}$, and boundary failure of the cutting edge proceeded rapidly. The tool reached the tool life due to fracture of the cutting edge of the tool at a cutting distance of 0.1 km.

It is to be understood that the embodiments and Examples disclosed herein are only illustrative and are not restrictive in all respects. The technical scope of the present invention is defined not by the description above but by the claims described below. The technical scope of the present invention includes all modifications within the scope of the claims and equivalents of the claims.

INDUSTRIAL APPLICABILITY

The sintered body including M sialon particles and cBN particles provides a tool material which has improved fracture resistance of a cutting edge of a cutting tool in addition to the feature of good wear resistance in high-speed cutting of a difficult-to-cut material such as heat-resistant alloys, the fracture resistance and the wear resistance being obtained by forming a coating layer containing a nitride or a carbonitride on the surfaces of cubic M sialon particles. The Examples have disclosed the effect in cutting of Ni-based heat-resistant alloys such as Inconel and Hastelloy. The sintered body exhibits good wear resistance and good fracture resistance also in cutting of difficult-to-cut materials such as Ti besides the Ni-based heat-resistant alloys and, in particular, can be applied to high-speed cutting.

The invention claimed is:

1. A sintered body comprising a first hard particle; a second hard particle; and a binder,
wherein the first hard particle is an M sialon particle having a coating layer, the M sialon particle is represented by $M_xSi_{(6-x-z)}Al_zO_zN_{(8-z)}$ (in the formula, M is a metal containing at least one selected from the group consisting of calcium, strontium, barium, scandium, yttrium, lanthanoid, manganese, iron, cobalt, nickel, copper, and group IV, group V, and group VI elements of the periodic table, and relationships of $0.01 \leq x \leq 2$, $0.01 \leq z \leq 4.2$, and $1.79 \leq (6-x-z) \leq 5.98$ are satisfied), and the second hard particle is a cubic boron nitride particle.

2. The sintered body according to claim 1, having a thermal conductivity of 5 W/m·K or more and 60 W/m·K or less.

3. The sintered body according to claim 1, wherein the M sialon particle contains at least cubic M sialon.

4. The sintered body according to claim 1, wherein the coating layer contains at least one of nitrides and carbonitrides of at least one element selected from the group consisting of Ti, Zr, Cr, and Al.

5. The sintered body according to claim 1, wherein the coating layer has a thickness of 0.01 μm or more and 2 μm or less.

6. The sintered body according to claim 1, wherein a ratio of a volume of the second hard particle to a volume of the first hard particle is 0.5 or more and 7 or less.

7. The sintered body according to claim 1, wherein a ratio of an intensity of a main peak of X-ray diffraction of $SiO_2$ to a total of intensities of main peaks of X-ray diffraction of α-M sialon, β-M sialon, cubic M sialon, and $SiO_2$ that are contained in the sintered body is 0.3 or less.

8. The sintered body according to claim 1, wherein a ratio of an intensity of a main peak of X-ray diffraction of cubic M sialon to a total of intensities of main peaks of X-ray diffraction of α-M sialon, β-M sialon, and cubic M sialon that are contained in the M sialon particle is 0.2 or more.

9. The sintered body according to claim 1, wherein the binder contains at least one element selected from the group consisting of Ti, Zr, Al, Ni, and Co and/or at least one of nitrides, carbides, oxides, and carbonitrides of the elements, and solid solutions thereof.

10. The sintered body according to claim 1, wherein a total content of the first hard particle and the second hard particle in the sintered body is 60% by volume or more and 90% by volume or less.

11. The sintered body according to claim 1, having a Vickers hardness of 22 GPa or more.

12. A cutting tool comprising the sintered body according to claim 1.

* * * * *